(12) United States Patent
Swiler

(10) Patent No.: US 6,485,557 B1
(45) Date of Patent: Nov. 26, 2002

(54) MANGANESE VANADIUM OXIDE PIGMENTS

(75) Inventor: Daniel Russell Swiler, Washington, PA (US)

(73) Assignee: $DMC^2$ Degussa Metals Catalysts Cerdec AG, Frankfurt (DE)

( * ) Notice: Subject to any disclaimer, the term of this patent is extended or adjusted under 35 U.S.C. 154(b) by 174 days.

(21) Appl. No.: 09/610,752

(22) Filed: Jul. 6, 2000

(51) Int. Cl.[7] .............................................. C04B 14/00
(52) U.S. Cl. ...................... 106/479; 106/474; 428/629; 501/15; 501/17
(58) Field of Search .................... 106/474, 479; 501/15, 17; 428/629

(56) References Cited

U.S. PATENT DOCUMENTS

| | | |
|---|---|---|
| 5,080,718 A | 1/1992 | Sullivan et al. |
| 5,851,587 A | 12/1998 | Schittenhelm et al. |
| 5,858,080 A | 1/1999 | Bugnon |
| 5,976,237 A | 11/1999 | Halko et al. |

*Primary Examiner*—Mark L. Bell
*Assistant Examiner*—Shalie Manlove
(74) *Attorney, Agent, or Firm*—Daniel P. Cillo; Eckert Seamans Cherin & Mellott, LLC

(57) ABSTRACT

Manganese vanadium oxides are used as pigments. The mnanganese vanadium oxide pigments are of the formula $Mn_2V_2O_7$. The, pigments are useful as colorants, and also possess improved reflectance characteristics in the infrared region, thereby reducing IR-induced heat buildup.

19 Claims, 2 Drawing Sheets

MANGANESE VANADIUM OXIDE PIGMENTS

FIELD OF THE INVENTION

The present invention relates to pigments with various advantages over traditional pigment formulations. More specifically, it relates to the use of manganese vanadium oxide compositions for use in pigmentary applications. The pigments may be used in plastics, paints, coatings, glass enamels, and other materials.

BACKGROUND INFORMATION

Pigments are widely used in various applications such as paints, inks, plastics, rubbers, ceramics, enamels and glasses. There are various reasons for using inorganic pigments. Pigments may impart coloristic properties and reflectance properties in the visible as well as ultraviolet (UV) and infrared (IR) reflectance spectrums. Their ability to perform this task depends upon which wavelengths are scattered, and which are absorbed when light interacts with them. In order to be suitable in a wide variety of applications, pigments must demonstrate a high degree of light fastness and high temperature stability. A summary of many inorganic pigments and some of their applications can be found in Volume 19 of the Fourth Edition of the Kirk-Othmer Encyclopedia of Chemical Technology, 1996. Classifications of conventional pigments are also given in the publication "DCMA: Classification and Chemical Description of the Mixed Metal Oxide Inorganic Colored Pigments", Second Edition, January 1982.

Typical black or dark colored pigments for the plastics industry are based on either carbon black, Cr—Fe based hematite blacks, or blacks formulated from various elements, usually containing two or more of the elements Ni, Mn, Cu, Fe and Cr arranged in a spinel type structure. In plastic applications with solar exposure, carbon black pigments absorb light not only in the visible range, but also in the infrared region. This leads to higher temperatures on the exposed colored surface, which may lead to higher cooling costs, or premature failure or degradation of the exposed part. Conventional Cu—Cr oxide compositions, which may contain other additives, do not have particularly good IR reflective properties, but they are useful at moderately elevated temperatures above the exposure temperatures at which carbon black is stable.

Hematite pigments composed of Cr—Fe and spinel pigments composed of transition metal oxides often exhibit IR reflective properties. This means that the pigments reflect more light outside the visible range, particularly in the infrared range, than in the visible range. This provides similar color as other pigments, but with a lower temperature when the object is exposed to infrared radiation.

Currently, several of the pigments classified in the Dry Color Manufacturers Association Classifications (DCMA) are used due to their IR reflective performance. The IR reflective performance is determined by the relative amount of reflectance provided in the solar infrared region of the spectrum, i.e. wavelengths of 700 to 2,500 nm compared with the visible region of the spectrum, i.e. wavelengths of 400 to 700 nm. Common black pigments such as carbon black have low reflectances in both regions. To obtain enhanced IR reflectance, inorganic black pigments from the classification DCMA 13-50-9 chrome iron nickel black spinel, or DCMA 3-05-3 chrome green black spinel, are conventionally used for these applications. The pigment DCMA 13-30-3 cobalt chromite green spinel also provides relatively high IR reflectance.

Manganese is used as a chromophore in several mixed metal oxide pigments. In the corundum structure, it is used to form manganese alumina pink corundum (DCMA 3-04-5). It is used as a chromophore in the rutile structure to form brown pigments, such as manganese antimony titanium buff rutile (DCMA 11-20-6), manganese chrome antimony titanium brown rutile (DCMA 11-46-7) and manganese niobium titanium brown rutile (DCMA 11-47-7). It is also a component in many spinel pigments to form brown or black colors. Examples are manganese ferrite black spinel (DCMA 13-41-9), chrome iron manganese brown spinel (DCMA 13-48-7) and chrome manganese zinc brown spinel (DCMA 13-51-7).

The above mentioned pigments may not provide the desired color values, have the desired chemistry and/or provide the desired infrared reflectance properties for many applications. The present invention provides pigments with enhanced color, composition and performance characteristics.

SUMMARY OF THE INVENTION

This invention relates to manganese vanadium oxide pigments that can be represented by the formula $Mn_xV_yO_z$, where $2x+2.5y \geq z$. These colorants can be used to form colored objects or coatings through their use in applications such as paints, inks, plastics, glasses, ceramics and the like.

In accordance with an aspect of the present invention, the manganese vanadium oxide pigments provide high infrared reflectance. Such high infrared reflectance may result in substantially less heat build up in colored objects using the pigments.

Another aspect of the present invention is to provide pigments which have the ability to change to a different color when exposed to high temperatures. For example, when surfaces containing these materials are subjected to high temperatures by laser marking, legible marks are obtained.

Another aspect of the present invention is to provide pigments which facilitate recycling of colored ceramic or glass articles. When such colored ceramic or glass objects are recycled, less objectionable coloration is passed on to the recycled glass than with conventional black colorants containing cobalt, chromium, nickel and other elements.

Further aspects of the present invention relate to the production of manganese vanadium oxide pigments, substitution of other elements into these pigments, and the use of protective or functional coatings on these pigments in order to enhance their properties.

Another aspect of the present invention is to provide a method of making manganese vanadium oxide pigments. One method includes the steps of mixing vanadium-containing and manganese-containing powders capable of yielding metal oxides, and calcining the mixture.

A further aspect of this invention is to provide a method of coloring an article by applying the present manganese vanadium oxide pigments on or in the article.

These and other aspects of the present invention will be more apparent from the following description.

DETAILED DESCRIPTION

Figure 1:
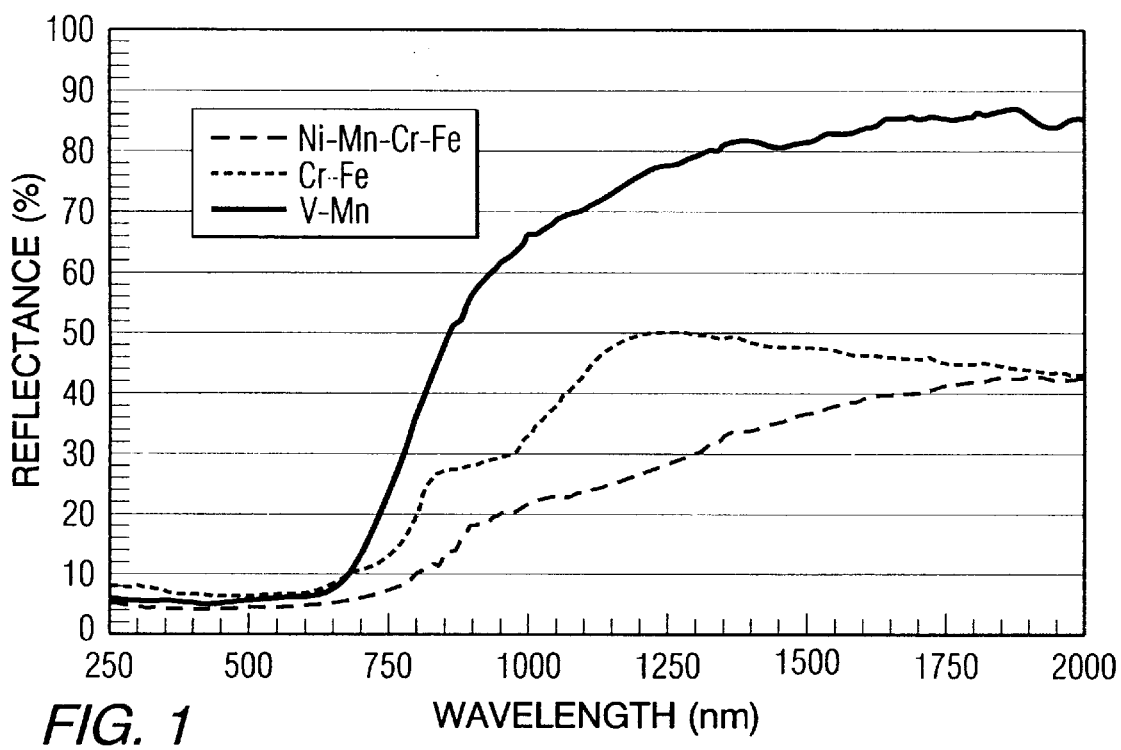
FIG. 1 is a graph illustrating the visible and infrared reflectance characteristics of a black Mn—V—O pigment of the present invention in a masstone application at wavelengths up to 2,000 nm, in comparison with conventional Cr—Fe—O and Ni—Mn—Cr—Fe—O black pigments.

This invention relates to the use of manganese vanadium oxides as pigments. These manganese vanadium oxide pigments are of the formula $Mn_xV_yO_z$, where $2x+2.5y \geq z$. In this formula, the oxidation state of Mn is less than or equal to 4+, and the oxidation state of V is less than or equal to 5+. Preferably, y ranges from 0.08x to 12x, more preferably from 0.25x to 4x. In a preferred embodiment, the manganese vanadium oxide comprises $Mn_2V_2O_7$.

The present manganese vanadium oxide pigments typically have average particle sizes of from about 0.1 to about 20 microns, preferably from about 0.2 to about 10 microns, and more preferably from about 0.5 to about 5 microns.

Manganese vanadium oxide materials of the above-noted formula have been found to possess favorable colorant properties. The pigments are useful in many applications, including organic chemical compositions such as plastics, rubbers and the like, coating compositions such as paints, printing inks and the like, and inorganic chemical compositions such as glass enamels, porcelain enamels and the like.

In addition to their use as colorants, the manganese vanadium oxide pigments of the present invention may provide improved infrared reflectance and reduced heat buildup properties. As used herein, the term "IR" reflectance" means the reflectance properties of a material at wavelengths above about 700 nm. The IR wavelengths include near-IR (750–2,000 nm), mid-IR (2,000–4,000 nm) and far-IR (4,000–5,500 nm).

The present manganese vanadium oxide pigments may optionally include up to about 10 weight percent or more of at least one dopant selected from Groups I-A, II-A, II-A, IV-A, V-A, VI-A, VII-A, VIII-A, I-B, II-B, III-B, IV-B, V-B, VIII-B, the Actinide elements and the Lanthanide elements of the Periodic Table. For example, iron and other metal atoms may substitute for the manganese constituents of the present pigments.

The manganese vanadium oxide pigments of the present invention may be formed by processes such as mixing and calcining, or chemical techniques such as sol-gel or precipitation, which may then be followed by a calcination step. A particularly preferred process for making the present manganese vanadium oxide pigments is to mix vanadium oxide or ammonium salt with manganese oxide or carbonate powders, followed by calcination. Mixing includes the processes of milling the pigments, either dry or wet, pulverizing, blending or like processes. The weight ratio of vanadium oxide or salt to manganese oxide or carbonate preferably ranges from about 1:10 to about 10:1, more preferably from about 1:3 to about 3:1. In this embodiment, the mixed powders are preferably calcined at temperatures of from about 500 to about 1,400° C., more preferably from about 700 to about 1,300° C. Calcination times of from about 1 to about 60 hours are preferred, more preferably from about 2 to about 8 hours. For instance, 49 weight percent manganese dioxide and 51 weight percent vanadium oxide may be mixed and calcined at 900° C. for 4 hours to form the pigment. The ratio of manganese to vanadium may be adjusted in order to achieve compositions having the desired color characteristics.

A full or partial coating of one or more layers may be placed on the surface of the present pigments. Inorganic pigment coatings are known in the art. Examples of coating compositions which may be suitable for use with the present pigments are disclosed in U.S. Pat. Nos. 5,851,587, 5,976,237 and 5,858,080, which are incorporated herein by reference. Coatings may be applied for a variety of reasons. In the case where there is an unfavorable reaction between the surface of the pigment and the medium where it is being used, a protective layer is often used. These protective layers are typically silica, alumina, and other metal oxides, but may also be other elements, compounds or organic materials. Functional coatings may be applied in order to change the conductivity of the surface, modify optical properties or enhance the surface reactivity.

Exemplary coating methods include precipitation, which is typically initiated by passing the pH of a solution through the isoelectric point. Another method comprises coating the pigment particles with a liquid that contains the coating material either in solution or suspension, and drying the particles until a solid coating is produced on the surface of the pigment. Other methods known in the art may also be used.

The pigments of the present invention may be used as colorants for various types of substrates. Plastic or rubber compositions to which the manganese vanadium oxide pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produce by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methacrylic acid esters, butadiene, as well as copolymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures.

The present pigments may also be used with film formers or binders for lacquers, paints or printing inks such as linseed oil, nitrocellulose, melamine resins, acrylic resins, ureaformaldehyde resins and the like. The present manganese vanadium oxide pigments may be incorporated in a liquid or a paste form. Suitable liquid carriers for the vanadium manganese oxide pigments include pine oils, vegetable oils, mineral oils, low molecular weight petroleum fractions, tridecyl alcohols, synthetic resins and natural resins.

In a further embodiment, a substrate may be coated with a glass-ceramic enamel composition including the present pigments, and then fired. The substrate may comprise, for example, automotive glass, architectural glass, container glass, metal or the like.

The following examples are intended to illustrate various aspects of the present invention, and are not intended to limit the scope of the invention.

EXAMPLE 1

A pigment is made by mixing 49 g $MnO_2$ and 51 g $V_2O_5$ in a blender, and then mixing the powder in a hammer mill through an 0.02 inch screen. The powder mixture is heated in a kiln to 900° C., held at this temperature for a period of 4 hours, and then cooled to room temperature. The calcined powder is wet-ground for 4 hours, filtered and dried. The dry powder obtained is a manganese vanadium oxide phase of the formula $Mn_2V_2O_7$ with a vanadium to manganese molar ratio of 1:1. The powder is a brown black pigment exhibiting high IR reflectance characteristics.

Tint trials are prepared by mixing 2 grams of the $Mn_2V_2O_7$ pigment with 7 grams of $TiO_2$ and 63 grams RPVC resin system. This mixture is dispersed on a heated two-roll mill at 420° F. for a period of 3 minutes. Masstone trials are prepared by the same method but have no $TiO_2$ additions and a total weight of RPVC resin of 70 g. Measurement of both color values and reflectance percentage at 1,100 nm are performed using a Datacolor CS-5. The standard CIELAB L*a*b* system is used to define the color of the pigment. The L* value refers to the lightness of the sample, with L*=100 designating the lightness upper limit and L*=0 designating the darkness lower limit. The a* describes the red or green value of the pigment, with a positive a* value designating red, and a negative value designating green. The b* represents the blue or yellow value, with positive b* designating yellow and negative b* designating blue.

Table 1 lists the tint and masstone color values and IR reflectance values of the $Mn_2V_2O_7$ samples.

TABLE 1

Color and IR Reflectance Values of Tint and Masstone $Mn_2V_2O_7$ Samples

|  | L* | a* | b* | IR Reflectance at 1,100 nm (%) |
|---|---|---|---|---|
| $Mn_2V_2O_7$ Tint Sample | 57.50 | 3.82 | 1.18 | 82.34 |
| $Mn_2V_2O_7$ Masstone Sample | 28.80 | 3.35 | 2.81 | 65.61 |

As can be seen by the foregoing color values, the Mn—V—O pigment is slightly red and yellow. Visually this pigment is a brownish black. Both the tint and masstone samples exhibit high IR reflectance values.

EXAMPLE 2

Example 1 is repeated except the calcination temperature of the mixture is increased from 900° C. to 1,200° C. The resultant $Mn_2V_2O_7$ pigment exhibits visual and IR characteristics comparable to the pigment of Example 1.

EXAMPLE 3

The pigment of Example 1 was tested in a typical automotive glass enamel coating on a glass substrate at a temperature of 1,225° F. against a typical Cu—Cr spinel black. The pigment was stable up to temperatures of 1,225° F. in the glass enamel. However, the color changed from black to brown. The color as tested is as follows: L*=38.6; a*=65; and b*=12.6.

Another measure of pigment colorant properties is provided in terms of strength. Pigment strength is a measure of how much pigment is needed to produce a desired color compared with a standard pigment, for example, when mixed with a scattering pigment such as $TiO_2$ in a tint application. For example, in a sample where twice as much pigment must be mixed with $TiO_2$ to develop the same color as a standard pigment, such a pigment would be half as strong as the standard pigment, or have a stength of 50 percent. Strength can be measured by adding pigment to samples until the color value is similar to a standard sample, and then calculating the strength value based upon the amount of pigment required. For black pigments, strength values are closely related to L* values. Stronger black pigments yield lower L* values, while weaker black pigments yield higher L* values.

The use of the present manganese vanadium oxide pigments in various applications may provide improved IR reflectance characteristics. FIG. 1 illustrates improved IR reflectance characteristics achieved with the present manganese vanadium pigments in comparison with conventional pigments. The reflectance curves of the Mn—V—O pigment are compared with Ni—Mn—Fe—Cr—O and Cr—Fe—O black pigments in RPVC masstone trials. The masstone samples tested in FIG. 1 were prepared by mixing 2 grams of pigment prepared as in Example 1 with an unpigmented RPVC resin. The pigment was fused into the RPVC on a 2 roll mill, and then pressed flat.

As illustrated in FIG. 1, materials comprising the present manganese vanadium oxide pigments possess comparable color and reflectance characteristics at visible wavelengths in comparison with the conventional colorants, but possess markedly increased reflectance characteristics at IR wavelengths in comparison with materials comprising the conventional pigments. The present manganese vanadium oxide black pigments therefore appear relatively dark at visible wavelengths and relatively light at IR wavelengths. These reflectance characteristics are highly advantageous in applications where heat buildup due to the absorption of IR radiation is to be minimized.

Samples such as those shown in FIG. 1 with IR reflectances of greater than, e.g., 50 percent at 1,100 nm, will generally perform well in heat buildup tests. Thermal energy from solar radiation is absorbed at wavelengths of up to about 2,500 nm. In an embodiment of the present invention, the manganese vanadium oxide pigments preferably exhibit increased IR reflectances at wavelengths of up to 2,500 nm and above.

In addition to the masstone results illustrated in FIG. 1, comparative tint trials were performed to evaluate the color of the pigments when mixed with a white $TiO_2$ pigment. In this case, the pigment prepared in Example 1 and the comparative Ni—Mn—Cr—Fe—O and Cr—Fe—O pigments were each mixed with 70 grams of RPVC resin which already contained approximately 10 percent pigmentary grade $TiO_2$. This provides a way to evaluate the IR reflective properties of the present pigments in comparison with other pigments when mixed in a color formulation.

Figure 2:
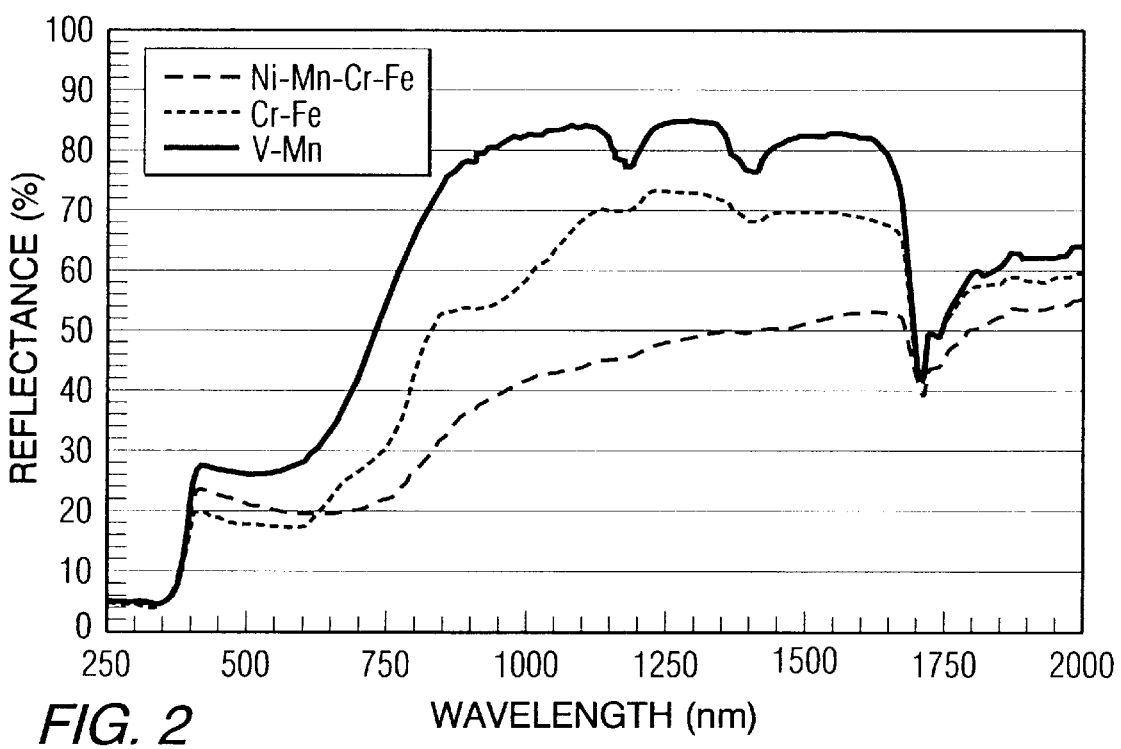
FIG. 2 is a graph illustrating the visible and infrared reflectance characteristics of a black Mn—V—O pigment of the present invention in a tint application at wavelengths up to 2,000 nm, in comparison with conventional Cr—Fe—O and Ni—Mn—Cr—Fe—O black pigments.

FIG. 2 illustrates the improved IR reflectance characteristics achieved with the manganese vanadium oxide pigment tint sample of the present invention in comparison with the conventional Ni—Mn—Fe—Cr—O and Cr—Fe—O samples. As illustrated in FIG. 2, the tint sample comprising the present manganese vanadium oxide pigment possesses good color and reflectance characteristics at visible wavelengths in comparison with the conventional colorants, but possesses substantially increased reflectance characteristics at IR wavelengths in comparison with the conventional pigments. As shown in FIG. 2, reflectance values for the tint sample containing the present manganese vanadium oxide pigment are above 75 percent throughout a substantial portion of the IR region, with reflectance values above 80 percent in some parts of the IR spectrum.

In tint applications, the manganese vanadium oxide pigments typically reflect more in one or more wavelengths in the infrared region of the spectrum than in the visible region of the spectrum. The amount of this reflectance increase depends upon the amount of the pigment used compared to other pigments in the color formulation, and the matrix that contains these pigments. For example, when only a small amount of pigment is added, and the $TiO_2$ of the tint sample produces a very high reflectance in the visible range, only small increases in the IR reflectance is expected.

Another measure of the improvement in the reflectivity in the IR region is by using the standard Kubelka Munk scattering equation: $K/S=(1-R)^2/2R$, where R is the measured reflectance of the material, after accounting for surface reflection. In the case where a completely opaque sample is produced by adding high scattering pigments, and effects of surface scattering are negligible, the amount of scattering (S) may be calculated versus the amount of absorption (K) for the pigment itself. By applying the Kubleka Munk equation to samples with significant amounts of pigmentary grade $TiO_2$, characteristic of tint trials, and by subtracting typically 4.5 percent from the reflectance values to compensate for reflection at the surface of the article, the K/S can be calculated. This calculation shows that the K/S in the optical region is much higher or more absorbing that in the IR regions.

Figure 3:
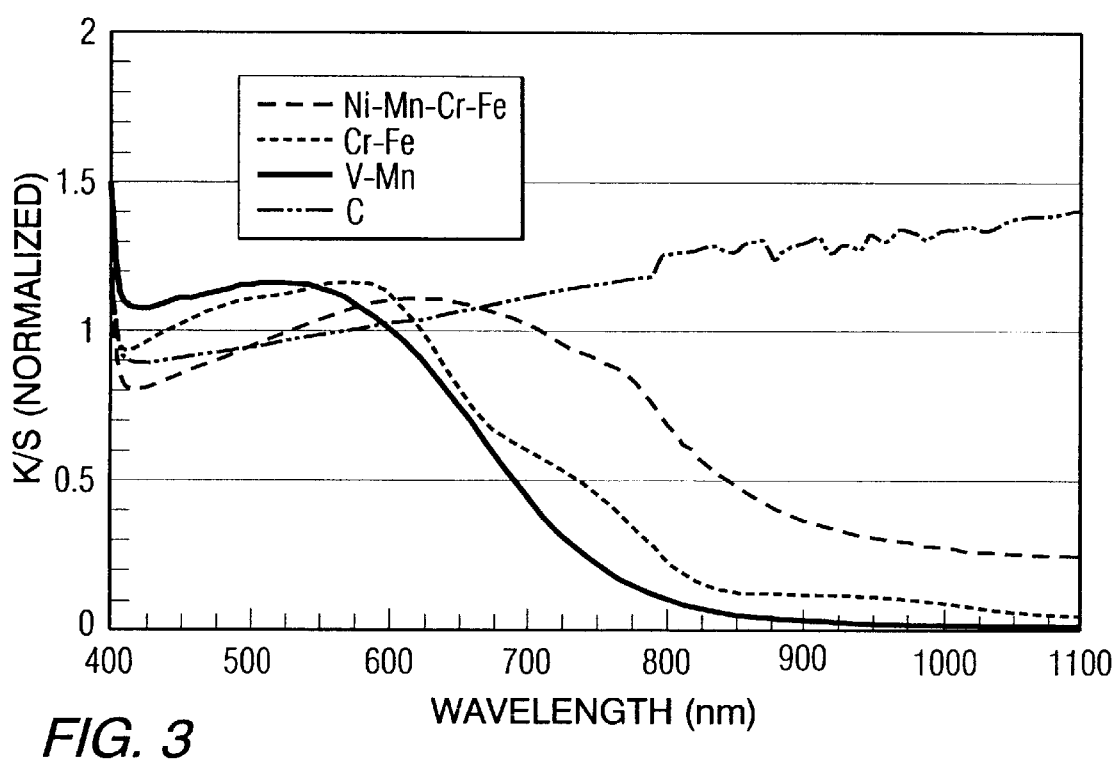
FIG. 3 is a graph illustrating visible and infrared Kubelka Munk scattering (K/S) values, normalized to be an average of 1 in the visible range of 400 to 700 nanometers, for a black Mn—V—O pigment of the present invention, in comparison with conventional Cr—Fe—O, Ni—Mn—Cr—Fe—O and carbon black pigments.

A plot showing the K/S values for a manganese vanadium oxide pigment of the present invention in comparison with conventional Ni—Mn—Cr—Fe—O, Cr—Fe—O and carbon black pigments, with the visible region normalized to a value of 1, is shown in FIG. 3. The present pigments preferably exhibit K/S values compared to wavelengths in the visible region of 50 percent or less for at least one of the infrared wavelengths above 800 nm, more preferably less than 30 percent, and most preferably less than 15 percent.

In accordance with the present invention, plastic, rubber, paint and other compositions incorporating the present pigments may possess reduced heat buildup characteristics due to the improved IR reflectance properties. Also, various types of substrates may be coated with the present pigments, such as wood, glass, ceramic, metal, plastic and composite substrates to provide an organic coating or paint which provides low heat buildup properties.

As shown below in Table 2, a masstone sample comprising the vanadium manganese oxide pigment of Example 1 exhibits substantially decreased heat buildup when subjected to IR radiation in comparison with commercially available pigments. The comparative pigments listed in Table 2 are commercially available: Columbian Chemical Co. Raven 450 (carbon black ); Cerdec 10335 (Co—Cr—Fe); and Cerdec 10333 (Ni—Mn—Cr—Fe). The ability of the present pigments to reduce IR-induced heat buildup has particular significance for uses such as architectural, automotive, military, aerospace, industrial and electronics applications.

TABLE 2

Infrared Radiation Induced Heat Build-up Measurements ASTM D4803

| Sample | Max Temp (° F.) | Heat build-up difference (° F.) |
|---|---|---|
| Carbon Black | 210.0 | — |
| Mn—V | 172 | −38 |
| Co—Cr—Fe | 204 | −6.0 |
| Ni—Mn—Cr—Fe | 190.2 | −24.8 |

The present vanadium manganese oxide pigments possess several advantages. In some cases, use of the present pigments is based on the fact that they have good pigmentary properties in the visible range. They are stable in a wide range of applications, and have demonstrated excellent heat and weathering ability. A further advantage of the present manganese vanadium oxide pigments is that the IR reflectance is higher in comparison with conventional pigments.

Whereas particular embodiments of this invention have been described above for purposes of illustration, it will be evident to those skilled in the art that numerous variations of the details of the present invention may be made without departing from the invention as defined in the appended claims.

What is claimed is:

1. A pigment comprising manganese vanadium oxide of the formula $Mn_2V_2O_7$.

2. A The pigment of claim 1, wherein the pigment exhibits an increased reflectance at infrared wavelengths in comparison with visible wavelengths.

3. The pigment of claim 1, wherein the pigment exhibits an absorption to scattering ratio K/S of less than about 50 percent at an infrared wavelength above 800 nm in comparison with visible wavelengths.

4. The pigment of claim 1, wherein the pigment exhibits an absorption to scattering ratio K/S of less than about 30 percent at an infrared wavelength above,8,00 nm in comparison with visible wavelengths.

5. The pigment of claim 1, wherein the pigment exhibits an absorption to scattering ratio K/S of less than about 15 percent at an infrared wavelength above 800 nm in comparison with visible wavelengths.

6. A coating composition comprising:

a liquid carrier; and a pigment comprising $Mn_2V_2O_7$ dispersed in the carrier.

7. The coating composition of claim 6, wherein the pigment comprises from about 0.1 to about 50 weight percent of the coating composition.

8. An enamel composition comprising:

at least one glass flit: and a pigment comprising manganese vanadium oxide, where the manganese vanadium oxide is of the formula $Mn_2V_2O_7$.

9. The enamel composition of claim 8, wherein the pigment comprises from about 0.1 to about 70 weight percent and the at least one glass frit comprises from about 30 to about 99.9 weight percent of the enamel composition.

10. An article comprising:

a substrate matrix; and a pigment comprising $Mn_2V_2O_7$ dispersed in the substrate matrix.

11. The article of claim 10, wherein the substrate comprises glass or plastic.

12. An article comprising:

a substrate; and a coating including a pigment comprising manganese vanadium oxide covering at least a portion of the substrate, wherein the manganese vanadium oxide is of the formula $M_2V_{27}$.

13. The article of claim 12, wherein the substrate comprises glass, ceramic, metal, plastic, carbon or composite.

14. A method of making a manganese vanadium oxide pigment comprising:

mixing powders of vanadium oxide or precursors capable of forming vanadium oxide with manganese oxide or precursors capable of forming manganese oxide; and calcining the mixture to obtain manganese vanadium oxide comprising $Mn_2V_{27}$.

15. The method of claim 14, further comprising calcining the mixture at a temperature of from about 700 to about 1,300 degrees C.

16. The method of claim 14, further comprising comminuting the calcined mixture to an average particle size of from about 0.1 to about 10 microns.

17. A method of coloring an article, the method comprising providing a manganese vanadium oxide pigment in or on the article, wherein the manganese vanadium oxide is of the formula $Mn_2V_{27}$.

18. The method of claim 17, wherein the manganese vanadium oxide pigment is dispersed in at least a portion of the article.

19. The method of claim 17, wherein the manganese vanadium oxide pigment is provided in a coating covering at least a portion of the article.

* * * * *

UNITED STATES PATENT AND TRADEMARK OFFICE
CERTIFICATE OF CORRECTION

PATENT NO. : 6,485,557 B1
DATED : November 26, 2002
INVENTOR(S) : Daniel Russell Swiler It is certified that error appears in the above-identified patent and that said Letters Patent is hereby corrected as shown below:

Title page,
Item [57], ABSTRACT,
Line 2, "mnanganese" should read -- manganese --.
Line 3, "The, pigments" should read -- The pigments --.

Column 8,
Line 40, "above,8,00" should read -- above 800 --.
Line 48, "$Mn_2V_2O_7$" should read -- manganese vanadium oxide --.
Line 48, after "carrier" insert -- wherein the manganese vanadium oxide is of the formula $Mn_2V_2O_7$ --.
Line 54, "flit" should read -- frit --.

Column 9,
Lines 6, "$M_2V_{27}$." should read -- $Mn_2V_2O_7$. --.
Line 15, "$Mn_2V_{27}$." should read -- $Mn_2V_2O_7$. --.

Column 10,
Line 10, "$Mn_2V_{27}$." should read -- $Mn_2V_2O_7$. --.

Signed and Sealed this

Twenty-fifth Day of March, 2003

JAMES E. ROGAN
*Director of the United States Patent and Trademark Office*